United States Patent [19]

Okuyama

[11] Patent Number: 4,733,901
[45] Date of Patent: Mar. 29, 1988

[54] VEHICLE BODY STRUCTURE WITH A REAR LUGGAGE COMPARTMENT

[75] Inventor: Yoshihito Okuyama, Kanagawa, Japan

[73] Assignee: Nissan Motor Company, Limited, Yokohama, Japan

[21] Appl. No.: 854,099

[22] Filed: Apr. 21, 1986

[30] Foreign Application Priority Data

Apr. 22, 1985 [JP] Japan .................. 60-60067[U]

[51] Int. Cl.⁴ ............................................. B60N 1/06
[52] U.S. Cl. ................... 296/37.16; 296/64; 296/37.8; 297/112; 297/238
[58] Field of Search ............ 296/37.1, 37.8, 37.15, 296/37.16, 63, 65 R, 66, 64; 224/42.42, 311; 297/411, 412, 417, 112, 113, 115, 117, 238

[56] References Cited

U.S. PATENT DOCUMENTS

| | | | |
|---|---|---|---|
| 1,964,339 | 6/1934 | Brassell | 224/311 |
| 2,525,952 | 10/1950 | Saterlie et al. | 296/37.8 X |
| 2,549,925 | 4/1951 | Paton | 296/63 X |
| 3,095,232 | 6/1963 | Stevens | 296/65 R |
| 3,336,071 | 8/1967 | Neale et al. | 296/66 X |
| 3,356,409 | 12/1967 | Belsky et al. | 224/42.42 X |
| 3,374,032 | 3/1968 | Del Giudice | 297/417 X |
| 3,428,357 | 2/1969 | Lueck | 297/411 X |

FOREIGN PATENT DOCUMENTS

| | | | |
|---|---|---|---|
| 2536854 | 3/1977 | Fed. Rep. of Germany | 296/37.8 |
| 2755326 | 6/1979 | Fed. Rep. of Germany | 296/37.16 |
| 2951052 | 6/1981 | Fed. Rep. of Germany | 296/37.15 |
| 3143957 | 5/1983 | Fed. Rep. of Germany | 297/411 |
| 3419758 | 11/1985 | Fed. Rep. of Germany | 296/37.1 |
| 2369945 | 7/1978 | France | 297/417 |
| 54-9792 | 5/1979 | Japan . | |
| 58-116428 | 8/1983 | Japan . | |
| 750488 | 6/1956 | United Kingdom | 296/64 |
| 765048 | 9/1980 | U.S.S.R. | 296/64 |

Primary Examiner—Dennis H. Pedder
Attorney, Agent, or Firm—Leydig, Voit & Mayer

[57] ABSTRACT

A vehicle body structure with a rear luggage compartment is disclosed. The vehicle includes an armrest associated with the seat and movable into and out of a preset position, and a member movable together with the armrest. The member blocks and unblocks an opening when the armrest moves into and out of the preset position respectively. The opening allows access to the luggage compartment when the opening is unblocked.

23 Claims, 7 Drawing Figures

VEHICLE BODY STRUCTURE WITH A REAR LUGGAGE COMPARTMENT

BACKGROUND OF THE INVENTION

1. Field of the Invention

This invention relates to a vehicle with an interior luggage compartment.

2. Description of the Prior Art

Some conventional passenger cars have interior luggage compartments behind the rear seat. In general, a tonneau board or cover defines the closed roof of the luggage compartment. Opening the tonneau board or cover allows access to the luggage compartment. The conventional luggage compartment does not have sufficient capacity to accommodate elongated luggage, e.g., snow skis.

JP-U-58116428 discloses an example of a prior-art passenger sedan with a luggage compartment at the rear of the passenger compartment or cabin. The back of the rear seat of this passenger car includes an opening allowing access to the luggage compartment and a hatch blocking and unblocking the opening. The hatch in the seat back is pivotably connected to the reminder of the rear seat back. The hatch allows access to the luggage compartment via the opening when tilted onto a cushion of the rear seat. On the other hand, the hatch blocks access to the luggage compartment when in its proper position flush with the rest of the rear seat back.

JP-Y-549792, as shown in FIG. 7, discloses another example of a prior-art passenger car in which the center of the back 1 of the rear seat 2 has a rectangular recess 3 in its front surface which accommodates an armrest 4. The armrest 4 is pivotably mounted on opposite walls of the recess 3. The armrest 4 can be pivotted forward to rest horizontally above the seat cushion 5 of the rear seat 2. Thus, the occupants of the rear seat 2 can rest their arms on the armrest 4.

SUMMARY OF THE INVENTION

An object of this invention is to provide an improved vehicle with an interior luggage compartment. In order to achieve this object, one aspect of this invention includes a seat, an armrest associated with the seat and being movable into and out of a preset position, and a member being movable together with the armrest, the member blocking and unblocking an opening when the armrest moves into and out of the preset position respectively, the opening allowing access to the luggage compartment when the opening is unblocked.

An alternative form of this invention includes means defining a luggage compartmnt, means defining an opening which allows access to the luggage compartment, a console box, and a member movably connected to the console box, the member blocking and unblocking the opening when the member is in and out of a preset position respectively. According to this invention, the armrest for a seat can serve to block and unblock an opening which allows access to a luggage compartment.

DESCRIPTION OF THE PREFERRED EMBODIMENTS

The preferred embodiments of this invention will be described with reference to FIGS. 1 to 6.

Figure 1:
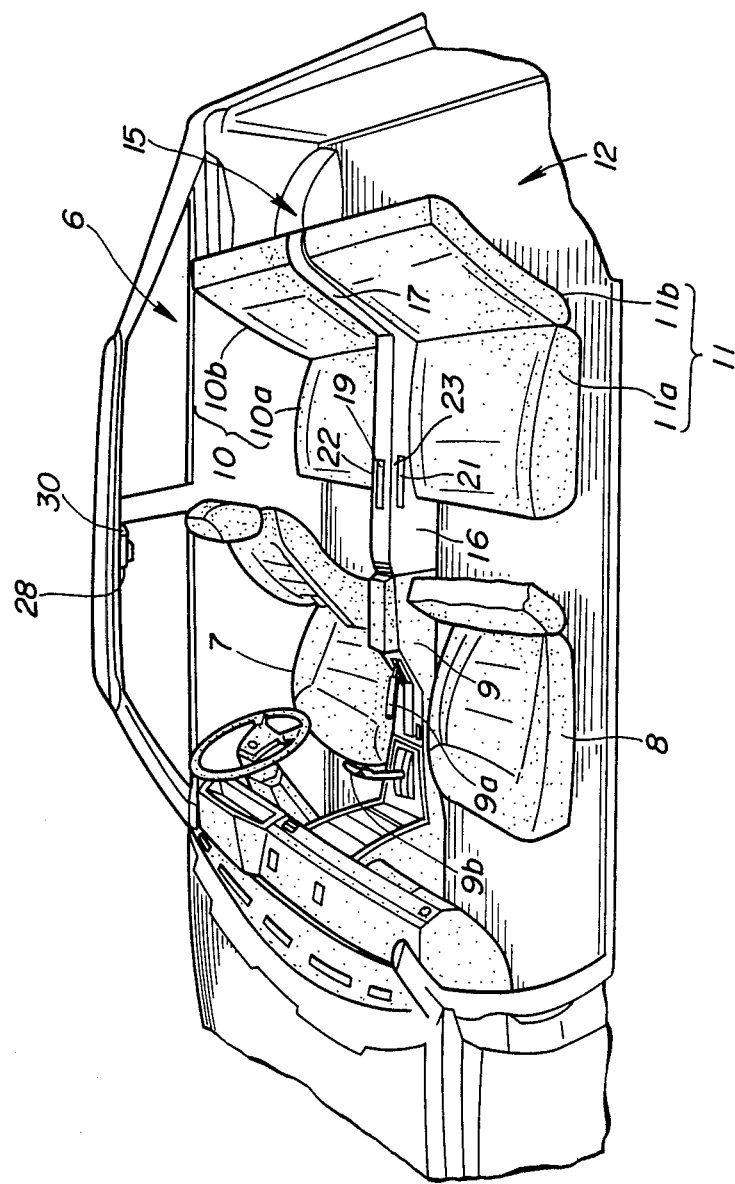
FIG. 1 is a perspective view of the interior of a car cabin of a car having a rear luggage compartment according to this invention.

As shown in FIG. 1, a car cabin of a hatchback automobile is designated by numeral 6, a pair of front seats are designated by 7 and 8 and a console box is designated by 9. The console box 9 is also located between the front seats 7 and 8. The rear end of the console box 9 extends slightly rearwards of the front seats 7 and 8. A hand brake lever 9a extends forwards from the front face of the console box 9. A shift lever 9b extends upwards from the floor of the automobile in front of the hand brake lever 9a.

Figure 3:
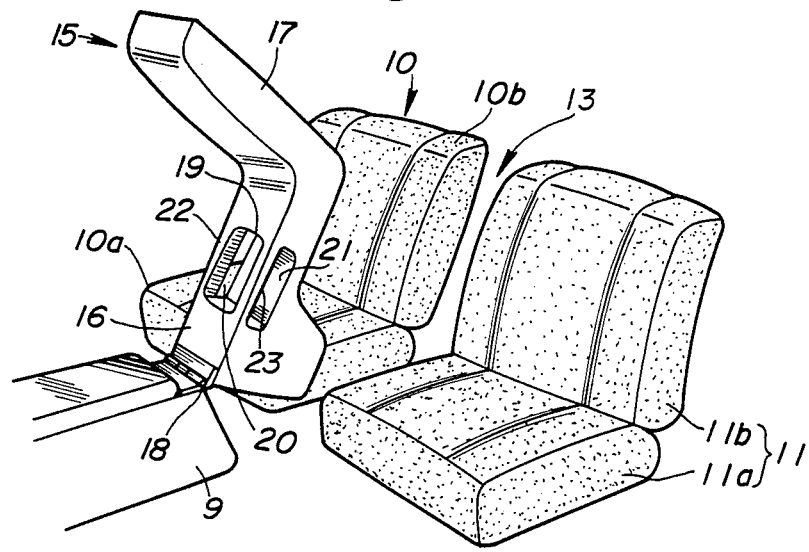
FIG. 3 is a perspective view of the portal for the rear luggage compartment of FIG. 1 when a member with the armrest is raised to open the front access to the rear luggage compartment.
Figure 4:
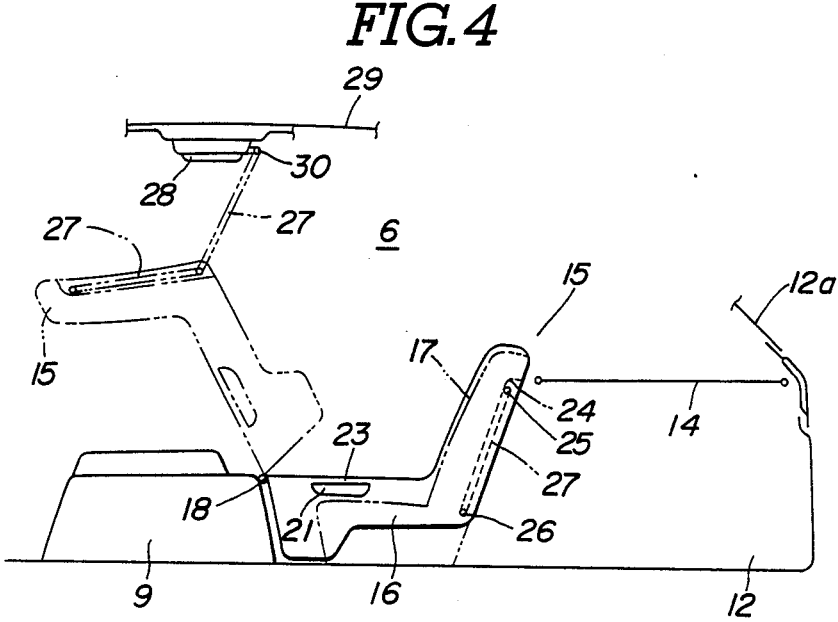
FIG. 4 is a diagram with the armrest shown in solid lines in its preset position and shown in phantom lines when in a second position.
Figure 5:
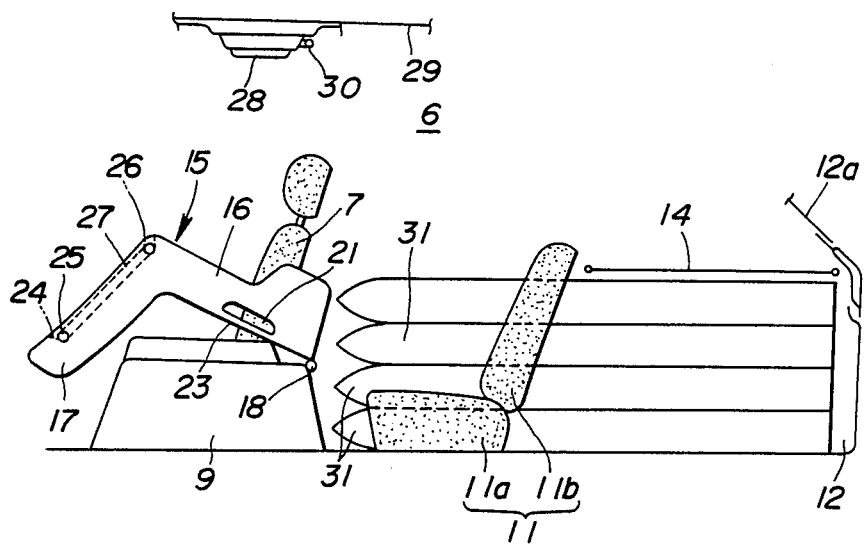
FIG. 5 is a side elevation of a car cabin in which the member with the armrest is tilted forwards to accommodate a plurality of skis.
Figure 6:
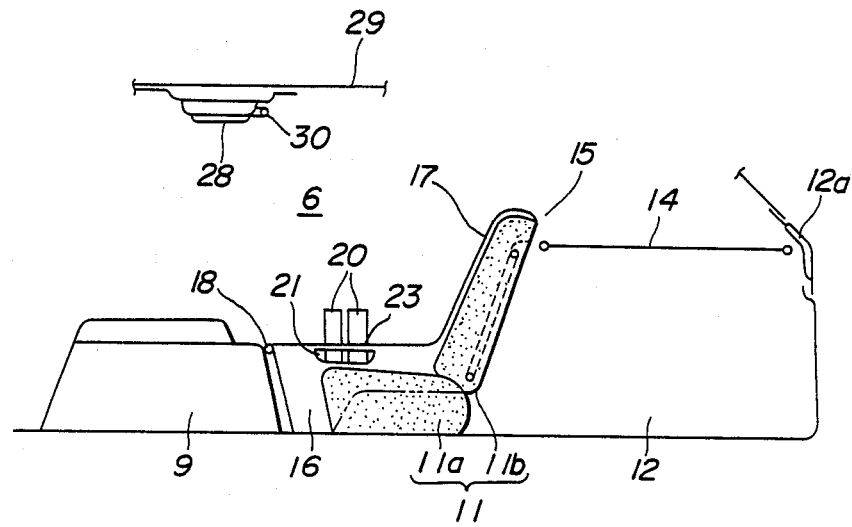
FIG. 6 is similar to FIG. 5, but shows the member with the armrest for the rear seats closing the front access to the rear luggage compartment.
Figure 7:
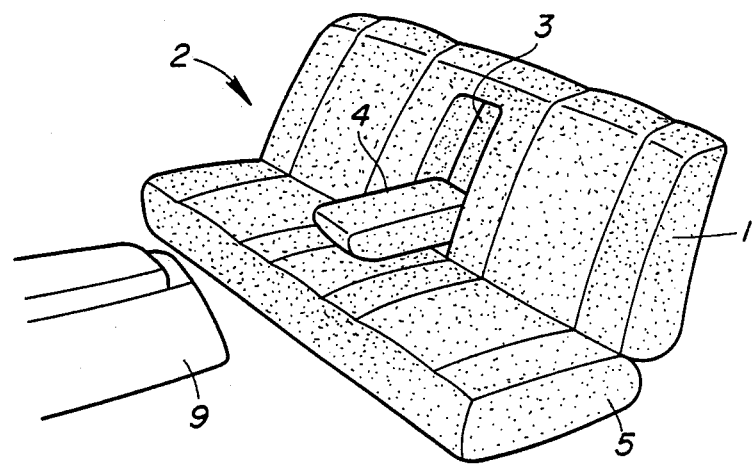
FIG. 7 is a perspective view of a rear seat of a car having a prior-art armrest.

A pair of rear seats 10 and 11 are located in front of a rear luggage compartment or trunk room 12 in the rear of the car cabin 6. The rear seats 10 and 11 are separated from each other by a clearance. Each of the rear seats 10 and 11 includes a set cushion 10a or 11a and seat back 10b or 11b. The seat backs 10b and 11b define part of the front wall of the rear luggage compartment 12. The clearance between the rear seats 10 and 11 provides an opening, a portion of which lies between the seat backs and a portion of which lies between the seat cushions, the opening allowing front access 13 to the rear luggage compartment 12, as best shown in FIG. 3. As shown in FIGS. 4 to 6, a tonneau board or cover 14 forms the roof of the rear luggage compartment 12. At the rear of the rear luggage compartment 12 is an upward-opening hatch 12a.

Figure 2:
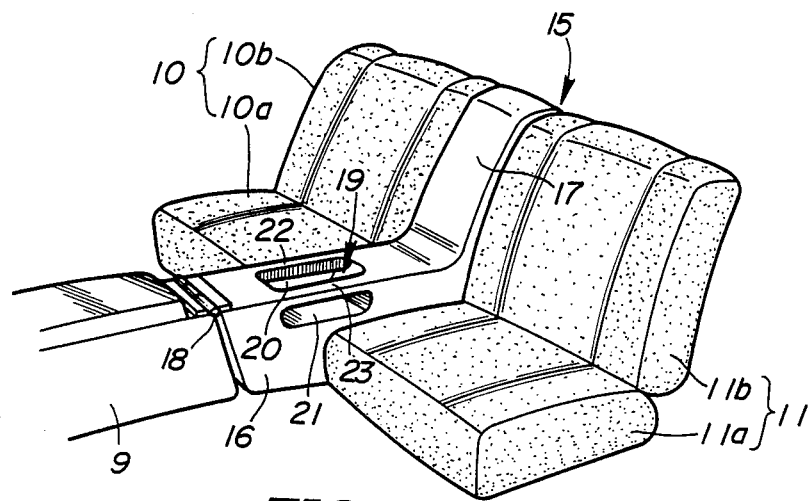
FIG. 2 is a perspective view of the portal for the rear luggage compartment of FIG. 1, namely a member with an armrest for rear seats sealing the front access to the rear luggage compartment.

As best shown in FIG. 2, a member 15, having a width substantially equal to that of the opening, is pivotably disposed in the front access 13 to the rear luggage compartment 12 thus substantially filling and unfilling the area provided by the opening as the member 15 moves into and out of the opening. The member 15 is essentially L-shaped and includes a horizontal armrest portion 16 and a vertical back portion 17, the vertical back portion 17 having a fixed angular position relative to the armrest portion. The front edge of the upper surface of the armrest portion 16 is connected to the rear edge of the upper surface of the console box 9 by means of a hinge 18, so that the member 15 can be pivoted within a longitudinal plane of the automobile. The armrest portion 16 includes a rectangular upper recess 19 and opposing rectangular side holes 20 and 21 united with the upper recess 19. Rod-like grips 22 and 23 are thus defined by the upper recess 19 and the side holes 20 and 21. The upper recess 19 serves to accommodate various small articles, e.g., beverage cans 20 (see FIG.

6). The contours of the back portion 17 essentially match those of the seat backs 10b and 11b of the rear seats 10 and 11. As shown in FIGS. 4 and 6, the rear surface of the back portion 17 includes an elongated recess 24 extending the length of the back portion 17. The upper end of the recess 24 has a pin 25 extending across the recess 24. Similarly, the lower end of the recess 24 has a pin 26 extending across the recess 24. A flexible stopper band 27 extends from the pin 26 to the pin 25. The lower end of the stopper band 27 is attached to the lower pin 26. The free end of the stopper band 27 is removably fitted onto the upper pin 25.

As best shown in FIG. 4, a room lamp 28 is fixed to the center of the ceiling 29 of the automobile. A grip 30 is disposed to the rear of the room lamp 28. When the member 15 is tilted forwards, the free end of the stopper band 27 can engage the grip 30.

The operation of the vehicle with a rear luggage compartment 12 according to this invention will be described below.

As shown in FIGS. 1 and 2, when the rear luggage compartment 12 need accommodate no elongated luggage, e.g., skis 31, longer than the length or width of the rear luggage compartment 12, the member 15 can assume its proper position, i.e., the member 15 seals the front access 13 to the rear luggage compartment 12. In this position, the occupants of the rear seats 10 and 11 can freely place their arms on the armrest portion 16 and support their bodies by gripping the grips 22 or 23. In addition, canned beverages 20 and the like can be securely placed in the upper recess 19, as shown in FIG. 6.

As shown in FIG. 3, when the member 15 is tilted forwards via the hinge 18, the front access 13 to the rear luggage compartment 12 is left opened. Here, the rear luggage compartment 12 can accommodate the major portions of various elongated luggage such as skis 31 through the opened hatch 12a. The front ends of the skis extend forward through the front access 13 into the cabin, the portion of the opening lying between the seats thus providing extra space for cargo, such as the skis 31. As shown in FIG. 4, the free end of the stopper band 27 is disengaged from the upper pin 25 and held by the grip 30. Thus, the member 15 is suspended above the console box 9 and will not interfere with operation of the hand brake lever 9a and the shift lever 9b by the driver.

What is claimed is:

1. A vehicle body with an interior luggage compartment comprising:
   (a) a seat arrangement including a pair of rear seats having a clearance providing an opening, said clearance and opening extending between lowermost and uppermost portions of said seats, said clearance separating said seats;
   (b) an armrest associated with said seat arrangement;
   (c) a console member; and
   (d) a member movably connected to said console member and movable together with said armrest into and out of said opening, said armrest and said member substantially filling and unfilling said clearance when said armrest and said member move into and out of said opening, respectively, said opening allowing access to the luggage compartment when said clearance is unfilled.

2. The vehicle body of claim 1 wherein each of said rear seats includes a seat cushion and a seat back, said seat backs constituting part of a front wall of the luggage compartment; and wherein said armrest is located between said seat cushions and said member is located between said seat backs when said armrest and said member substantially fill said clearance, said member having a width substantially equal to that of said opening and having a height substantially equal to that of said seat back.

3. The vehicle body of claim 1 said console member comprising a console box disposed two front seats and wherein said armrest is pivotably connected to said console box, said armrest being tiltable forward out of said opening to a position above said console box.

4. The vehicle body of claim 3 further comprising means for supporting said armrest above said console box.

5. The vehicle body of claim 4 wherein said support means comprises a grip mounted on an inner surface of a vehicle roof and an elongated flexible band, one end of said flexible band being fixed to said member and another end of said flexible band being capable of disengaging said member and engaging said grip.

6. The vehicle body of claim 5 wherein said member has a recess extending along a surface thereof, said recess accommodating said flexible band.

7. The vehicle body of claim 1 wherein an upper surface of said armrest has a recess.

8. The vehicle body of claim 1 wherein said armrest has a grip adapted to be gripped by occupants of said seat arrangement.

9. A structure for a seat arrangement of a vehicle comprising:
   means defining a space of an interior of the vehicle;
   a seat arrangement located at a rear part of the vehicle, said seat arrangement having a clearance between uppermost and lower most portions thereof defining an opening which allows access to said space;
   a console member; and
   a member movably connected to said console member and movable into and out of said opening, said member substantially filling said clearance and forming an armrest for said seat arrangement when said member is disposed in said opening, said member allowing access to the interior space through said opening when said member moves out of said opening.

10. A vehicle body structure comprising:
    means defining a luggage compartment;
    means defining an opening to allow access to said luggage compartment;
    a console box disposed forwardly of said means defining an opening; and
    a member movably connected to said console box, said member substantially filling and unfilling a clearance extending between uppermost and lowermost portions of said means defining an opening when said member moves into and out of a preset position, respectively.

11. The vehicle body structure of claim 10 wherein said means defining said opening comprises a seat arrangement and wherein said member further comprises an armrest portion forming an armrest of said seat arrangement when said member is in the preset position.

12. The vehicle body structure of claim 10 wherein said means defining said opening comprises a seat having a back portion and wherein said member is disposed adjacent to said back portion of said seat when said member is in the preset position.

13. The vehicle body structure of claim 10 wherein said means defining said opening comprises first and second seats disposed in a side-by-side relationship, each of said seats including a seat back and a seat cushion, a space between said seats forming said opening, said member having first and second portions, said first portion forming an armrest which extends between said seat cushions when said member is in the preset position, said second portion substantially filling said opening and being disposed adjacent to and substantially coplanar with said seat backs when said member is in the preset position.

14. The vehicle body structure of claim 13 wherein said first portion of said member is pivotally connected to said console box.

15. The vehicle body structure of claim 11 wherein said seat comprises two rear seats placed behind two front seats, each rear seat including a seat cushion and a seat back, said rear seats being separated from each other by said opening, said seat backs constituting part of a front wall of the luggage compartment; and wherein said armrest portion of said member is located between said seat cushions and a portion of said member is located between said seat backs when said member is in the preset position, a portion of said member having a width substantially equal to that of said opening.

16. The vehicle body structure of claim 15 wherein said console member is disposed between the front seats, said member being pivotably connected to said console member and tiltable forward from the preset position to a second position above said console member.

17. The vehicle body structure of claim 11 further comprising means for supporting said armrest above said console member while said armrest is in the second position.

18. The vehicle body structure of claim 17 wherein said support means comprises a grip mounted on an inner surface of a vehicle roof and an elongated flexible band, one end of said flexible band being fixed to said member and another end of said flexible band being capable of disengaging from said member and engaging said grip.

19. The vehicle body structure of claim 18 wherein said member has a recess extending along a surface thereof, said recess accommodating said flexible band.

20. The vehicle body of claim 1 wherein each of said pair of seats of said seat arrangement comprises a seat cushion and a seat back, and wherein said opening comprises first and second portions, said first portion of said opening extending between said seat backs and said second portion of said opening extending between said seat cushions.

21. The vehicle body of claim 20 wherein said member is arranged in a fixed angular position relative to said armrest.

22. The vehicle body of claim 21 wherein said member and said armrest substantially fill said first and second portions of said opening, respectively, when said member and said armrest move into said first and second portions of said opening, respectively, and wherein said member and said armrest allow access to said first and second portions of said opening, respectively, when said member and said armrest move out of said first and second portions of said opening, respectively.

23. A motor vehicle body comprising:
front seats;
two rear seats separated by a clearance extending therebetween, each seat comprising a seat cushion and seat back;
a luggage compartment located behind said rear seats;
an access opening allowing access to said luggage compartment and having first and second portions, said first portion comprising a portion of the clearance extending between said seat backs and said second portion comprising a portion of the clearance extending between said seat cushions;
a console box disposed in front of said rear seats; and
a member movably connected to said console box and movable into and out of said access opening, said member comprising an armrest portion and a back portion, said back portion substantially filling and unfilling said first portion of said opening while said armrest portion substantially fills and unfills said second portion of said opening, respectively, when said member moves into and out of said access opening, respectively.

* * * * *